(12) United States Patent
Nishiwaki

(10) Patent No.: US 9,325,200 B2
(45) Date of Patent: Apr. 26, 2016

(54) CHARGER, CONTROL METHOD AND TERMINAL APPARATUS

(71) Applicant: Kazuyuki Nishiwaki, Kanagawa (JP)

(72) Inventor: Kazuyuki Nishiwaki, Kanagawa (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 14/347,604

(22) PCT Filed: Sep. 26, 2012

(86) PCT No.: PCT/JP2012/074645
§ 371 (c)(1),
(2) Date: Mar. 26, 2014

(87) PCT Pub. No.: WO2013/047557
PCT Pub. Date: Apr. 4, 2013

(65) Prior Publication Data
US 2014/0247010 A1     Sep. 4, 2014

(30) Foreign Application Priority Data

Sep. 27, 2011   (JP) .................................. 2011-210404

(51) Int. Cl.
*H02J 7/00* (2006.01)
*H02J 7/02* (2006.01)
*H02J 17/00* (2006.01)
*H02J 5/00* (2006.01)

(52) U.S. Cl.
CPC ................. *H02J 7/025* (2013.01); *H02J 5/005* (2013.01); *H02J 17/00* (2013.01)

(58) Field of Classification Search
CPC ....................................................... H02J 7/025

USPC ......................................................... 320/108
See application file for complete search history.

(56) References Cited

U.S. PATENT DOCUMENTS

| 6,803,774 | B2 | 10/2004 | Park | |
|---|---|---|---|---|
| 7,026,789 | B2 * | 4/2006 | Bozzone | H02J 7/0044 320/108 |
| 8,415,834 | B2 | 4/2013 | Suzuki et al. | |
| 2009/0096413 | A1 | 4/2009 | Partovi et al. | |
| 2010/0295378 | A1 | 11/2010 | Suzuki et al. | |
| 2012/0256585 | A1 | 10/2012 | Partovi et al. | |
| 2013/0175983 | A1 | 7/2013 | Partovi et al. | |
| 2013/0293191 | A1 * | 11/2013 | Hidaka | H01F 38/14 320/108 |
| 2014/0152245 | A1 * | 6/2014 | Choi | H02J 7/0042 320/108 |

FOREIGN PATENT DOCUMENTS

| JP | H03-244474 | 10/1991 |
|---|---|---|
| JP | 2005-006460 | 1/2005 |

(Continued)

OTHER PUBLICATIONS

International Search Report corresponding to international Application No. PCT/JP2012/074645, Nov. 20, 2012. 5 pages.

(Continued)

*Primary Examiner* — Suresh Memula
(74) *Attorney, Agent, or Firm* — Wilmer Cutler Pickering Hale and Dorr LLP

(57) ABSTRACT

A charger includes a contactless charging unit that contactlessly charges an apparatus to be charged, a position aligning unit that performs position aligning of the apparatus to be charged, and a reducing unit that reduces an effect of the position aligning unit.

7 Claims, 4 Drawing Sheets

(56) References Cited

FOREIGN PATENT DOCUMENTS

| JP | 2005-180613 | 7/2005 |
| JP | 2006-060909 | 3/2006 |
| JP | 2007-011212 | 1/2007 |
| JP | 2010-035297 | 2/2010 |
| JP | 2010-098893 | 4/2010 |
| JP | 2010-273453 | 12/2010 |
| JP | 2011-064005 | 3/2011 |
| JP | 2012-095456 | 5/2012 |

OTHER PUBLICATIONS

Extended European Search Report issued by the European Patent Office for Application No. 12835419.8 dated May 28, 2015 (7 pages).

* cited by examiner

CHARGER, CONTROL METHOD AND TERMINAL APPARATUS

REFERENCE TO RELATED APPLICATION

This application is a national stage application of International Application No. PCT/JP2012/074645 entitled "Charger, Control Method and Terminal Apparatus," filed on Sep. 26, 2012, which claims the benefit of priority of Japanese Patent Application No. 2011-210404, filed on Sep. 27, 2011, the disclosures of which are incorporated herein in their entirety by reference thereto.

TECHNICAL FIELD

This invention relates to a charger, a control method and a terminal apparatus.

BACKGROUND

In contactless charging, conforming to a standard for contactless charging (non-contact charging) of an electronic equipment by mainly WPC (Wireless Power Consortium), an organization of manufacturers established for the purpose of specification development and promotion of Qi specification, such a system that enables contactless charging for a portable handset terminal of not less than 5 W, as an example, has been developed. The system is made up of a contactless charging pad (transmitter) conforming to the WPC specification and an apparatus to be charged (receiver) designed to cope with the contactless charging.

In a magnetic attraction type contactless charging pad that exploits a magnetic force for positioning (position aligning) an apparatus to be charged, position aligning between a power transmission coil provided in the contactless charging pad and a power reception coil provided in the apparatus to be charged is generally by exploiting an attractive force between the magnet disposed at the power transmission coil provided in the contactless charging pad and the other at a center or its vicinity of a power reception coil provided in the apparatus to be charged. In some of apparatuses to be charged, no magnet is provided, in which case the position aligning is done by referring to a mark for a placement position provided on the magnetic attraction charging pad.

In this sort of the magnetic attraction type charging pad, it may sometimes occur that the magnetic force from the contactless charging pad acts on the apparatus to be charged, such as portable handset terminal, thus presenting a problem as later discussed.

Patent Document 1 discloses a charging unit in which a voice coil of a loudspeaker is to be used also as a secondary coil for contactless charging.

Patent Document 2 discloses an arrangement in which a power supply unit includes a movable primary coil and an electronic equipment includes a stationary secondary coil, these two coils being used for positioning. That is, the primary coil is DC-driven and the secondary coil of the equipment is also DC-driven, in such a manner that an attractive force generated between the two coils and the movable coil is attracted towards the secondary coil. Power may then be then transmitted from the primary coil to the secondary coil by AC drive.

Patent Literature 1:
Japanese Patent Kokai Publication No. JP2010-35297A

Patent Literature 2:
Japanese Patent Kokai Publication No. JP2010-273453A

SUMMARY

The following gives analysis of the related techniques.

The magnetic attraction type contactless charging pad includes a magnet. There are thus occasions where a function or characteristic of an apparatus to be charged (receiver) is altered under an influence of a magnetic force from the magnet. For example, a portable phone terminal provided with a dynamic loudspeaker or a magnetic detection type on/off switch suffers from a problem that a magnet of the magnetic attraction type contactless charging pad influences a characteristic or function of the dynamic loudspeaker or the magnetic detection type on/off switch.

The present invention is invented to solve the above described problem. It is thus an object of the present invention to provide an apparatus and a method that improve an influence of a position aligning unit on an apparatus to be charged, when performing contactless charging.

According to the present invention, there is provided a charger comprising: a contactless charging unit to contactlessly charge an apparatus to be charged; a position aligning unit to perform position aligning of the apparatus to be charged; and a reducing unit to reduce an effect of the position aligning unit.

According to another aspect of the present invention, there is also provided a control method comprising the steps of:
  performing position aligning of the apparatus to be charged using a position aligning unit of a charger that performs contactless charging of the apparatus to be charged; and
  reducing an effect of the position aligning unit.

According to the present invention, it is possible to improve an influence of a position aligning unit on an apparatus to be charged, when performing contactless charging.

Still other features and advantages of the present invention will become readily apparent to those skilled in this art from the following detailed description in conjunction with the accompanying drawing wherein only exemplary embodiments of the invention are shown and described, simply by way of the best mode contemplated of carrying out this invention. As will be realized, the invention is capable of other and different embodiments, and its several details are capable of modifications in various obvious respects, all without departing from the invention. Accordingly, the drawing and descriptions are to be regarded as illustrative in nature, and not as restrictive.

MODES

Figure 1:
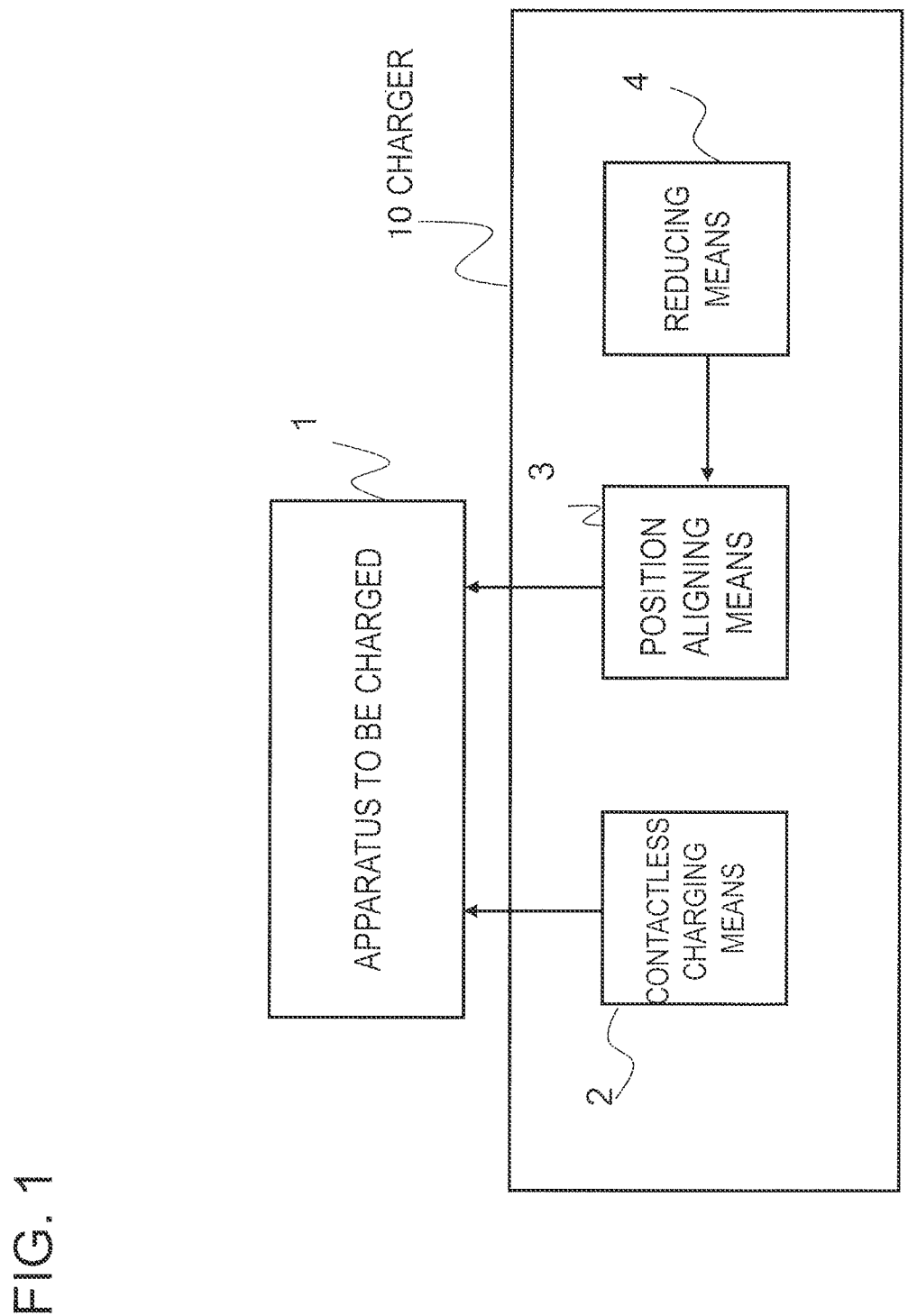
FIG. 1 is a block diagram for illustrating a mode of the present invention.

Referring to FIG. 1, there is provided, in one of modes according to the present invention, a charger (10) comprising:
a contactless charging means (unit) (2) to contactlessly charge an apparatus to be charged (1);

a position aligning means (unit) (3) to perform position alignment of the apparatus to be charged (1); and a reducing means (unit) (4) to reduce an effect of the position aligning means (unit) (3). The reducing means (unit) (4) may be configured to reduce an effect of the position aligning means (unit) (3) based on start of contactless charging by the contactless charging means (unit) (2), for example, after position alignment of the apparatus to be charged (1).

In one of the modes of the present invention, the position aligning means (3) in the charger (10) includes a magnet. In this mode, referring to FIG. 1, an arrow directed from the position aligning means (3) to the apparatus to be charged (1) indicate a magnetic force line (for positioning). The contactless charging means (2) may include, for example, a coil (power transmission coil) that transmits power by magnetic induction. An arrow directed from the contactless charging means (2) to the apparatus to be charged (1) indicates a magnetic force line (for power transmission).

In one of modes of the present invention, the reducing means (4) in the charger (10) performs control so as to cause a magnet composing the position aligning means (3) to be displaced to a position separated by a predetermined distance from the apparatus to be charged (1) to reduce an effect (a magnetic force) of the magnet. Alternatively, in another mode, the reducing means (4) may cover a magnet composing the position aligning means (3) by a magnetic shielding member or the like, thereby reducing an effect (magnetic force) of the magnet. In FIG. 1, an arrow directed from the reducing means (4) to the position aligning means (3) represents an action or a control to reduce an effect of the position aligning means (3). With such an arrangement, in performing contactless charging, it is possible to reduce an influence of the position aligning means (3) on the apparatus to be charged (1) (for example, suppressing an influence due to a magnetic force). The following describes in detail exemplary embodiments.

<Exemplary Embodiment 1>

In the case where a charging surface, in a magnetic attraction type contactless charging pad, is substantially horizontal and flat, it is unnecessary for a position aligning magnet to keep on exerting its magnetic attractive force to an apparatus to be charged, once the apparatus to be charged is placed on the planer contactless charging pad and has its position aligned by the position aligning magnet. It is noted that, in an apparatus to be charged (receiver) not equipped with a magnet for position alignment, position aligning is done using a mark indicating a placement position on the contactless charging pad (a user performs position alignment by visual check). Hence, position alignment by a magnet per se is unnecessary.

The present invention has been invented anew taking this into consideration. When an apparatus to be charged (receiver) is placed on a magnetic attraction type contactless charging pad (and after undergoing position alignment), and contactless charging is started, a position aligning magnet in the magnetic attraction type contactless charging pad is controlled so that a magnetism (magnetic force) of the magnet will not effect on the apparatus to be charged (receiver), or so that an influence of the magnetism of the magnet will be reduced (suppressed).

As one of the techniques, there is provided such an arrangement in which a position aligning magnet is provided on a charging pad surface of a power transmission coil unit in a magnetic attraction type contactless charging pad. After completion of position alignment of an apparatus to be charged (receiver) by the position aligning magnet, the magnet is displaced from the charging pad surface to a predetermined position where a magnetism (magnetic force) of the magnet no longer acts on the apparatus to be charged (receiver). As an alternative technique, a magnetic force from a position aligning magnet may be shielded or interrupted by a magnetic shielding member or the like.

Figure 2:
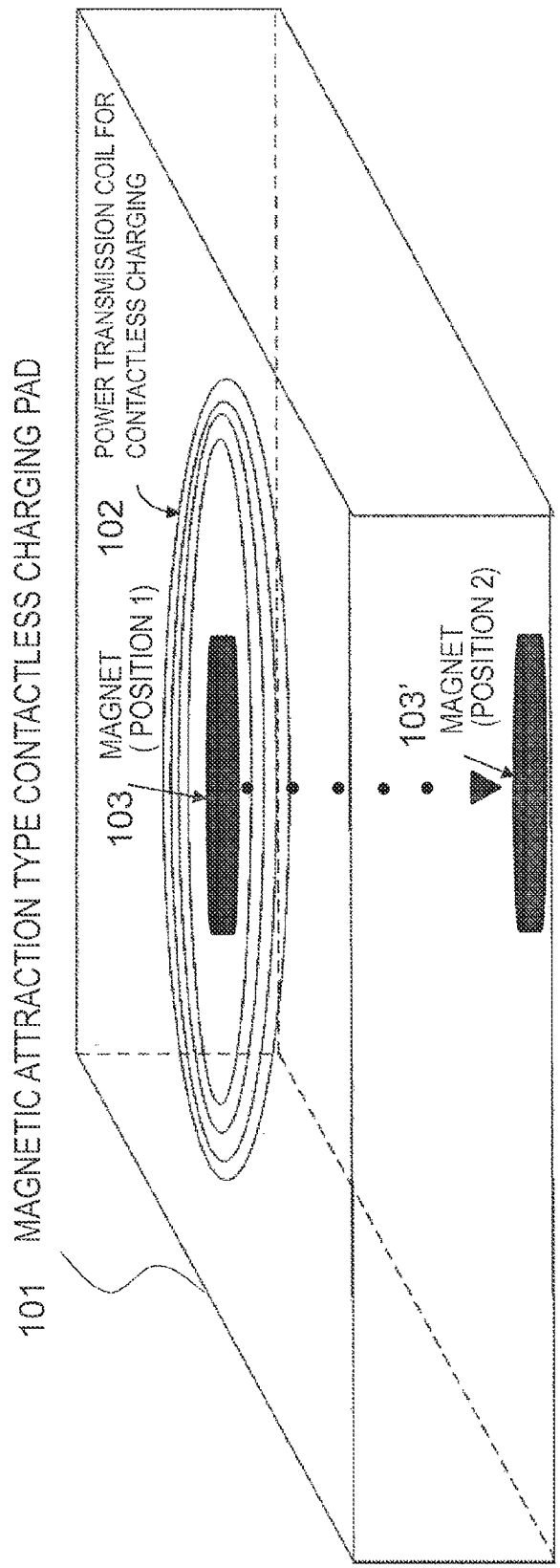
FIG. 2 is a schematic diagram for illustrating an arrangement of a first exemplary embodiment of the present invention.

FIG. 2 schematically illustrates an arrangement of the exemplary embodiment 1 of the present invention. A magnet 103 (for example, made up of a permanent magnet) is disposed on a charging pad surface (position 1) of a power transmission coil 102 for contactless charging in a magnetic attraction type contactless charging pad 101. The power transmission coil 102 of FIG. 2 corresponds to the contactless charging means of FIG. 1. The magnet 103 of FIG. 2 corresponds to the position aligning means 3 of FIG. 1. The position aligning of a receiver on the contactless charging pad 101 may be carried out, for example, at the position 1 where an effect of a magnetism of the magnet 103 on the receiver is maximal (that is, where the magnet 103 is closest to the receiver).

In FIG. 2, 103' denotes the position aligning magnet 103 itself after mechanical displacement from the position 1 (on the charging pad surface), in which the magnet 103 faces a receiver (apparatus to be charged) not shown, to another preset position (position 2), in which a magnetism from the magnet can no longer affect the receiver (apparatus to be charged). The magnet 103' is the same one as that denoted by 103. It is noted that a magnetic field strength is inversely proportionate to a square of a distance. In FIG. 2, the position 2 is set at a preset depth within the magnetic attraction type contactless charging pad 101, such that, when the position aligning magnet 103 is placed at this preset position, a magnetic force of the position aligning magnet 103 will not be act on the receiver, not shown, or will be sufficiently suppressed. In FIG. 2, a means to displace the magnet 103 from the position 1 to the position 2 corresponds to the reducing means 4 of FIG. 1. An instruction to reduce an effect of the position aligning means (3), that is, to displace the magnet 3 to the position 2, may be issued from the contactless charging means (2) of FIG. 1 to the reducing means (4) of FIG. 1 at a time when contactless charging is started. Or, the contactless charging pad 101 may be provided with a means to detect that the receiver has been set at a position optimum for contactless charging. In this case, contactless charging may be started at a stage the receiver has been set at such a position, at which time an instruction to reduce an effect of the position aligning means (3), that is, to displace the magnet 3 to the position 2, may be issued to the reducing means (4) of FIG. 1.

Figure 3:
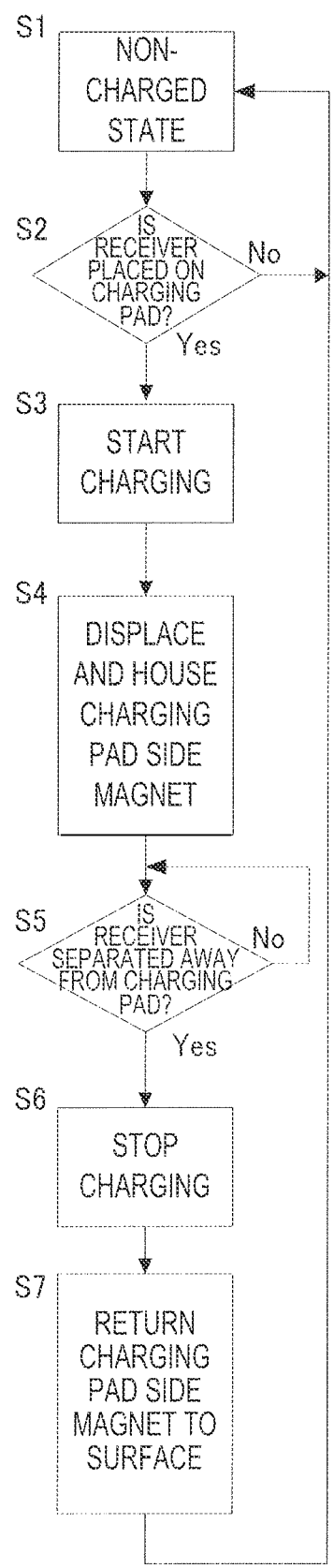
FIG. 3 is a flowchart for illustrating the processing by the first exemplary embodiment of the present invention.

FIG. 3 is a flowchart to explain an operation (processing sequence) of the exemplary embodiment 1 explained with reference to FIG. 2. The following describes a processing of the exemplary embodiment 1 with reference to FIGS. 2 and 3. The magnetic attraction type contactless charging pad 101 is in a non-charging state unless a receiver (an apparatus to be charged, which corresponds to the apparatus to be charged 1 of FIG. 1) is placed on the charging pad (step S1). At this time, the magnet 103 is at the position 1 which is a position on a case surface of the magnetic attraction type contactless charging pad 101.

Thereafter, when a receiver is placed on the magnetic attraction type contactless charging pad 101 (YES branch at a step S2), the receiver equipped with a magnet, is attracted by the magnetic force from the magnet 103 (at the position 1) of the magnetic attraction type contactless charging pad 101 to a position where an efficiency of contactless charging may be optimum, and gets its position adjusted. Regarding a receiver not equipped with a magnet, position alignment is carried out with an aid of a mark for a placement position, not shown, (manually by a user using a visual check), wherein the mark is provided on the magnetic attraction type contactless charging pad 101. In this manner, the receiver may be placed at a position in which the contactless charging efficiency becomes optimum.

After the receiver has its position aligned and is placed at the optimum position on the magnetic attraction type contactless charging pad 101 (after the step S2), contactless charging (non-contact charging) is started (step S3).

In the next step S4, the magnet 103 is mechanically displaced, within the magnetic attraction type contactless charging pad 101, from the position 1 (position on the charging pad surface) to the position 2 where the receiver is not affected by the magnetism (magnetic force), that is, the position where an effect of the magnetic force is sufficiently reduced.

Thereafter, the receiver is took off from the magnetic attraction type contactless charging pad 101 (YES branching at a step S5). Charging is then stopped (step S6).

In the next step S7, the magnet 103 is, for example, mechanically moved, within the magnetic attraction type contactless charging pad 101, from the position 2 (the position where the receiver is not affected by a magnetism or where an effect of a magnetic force is sufficiently reduced) and returned to the original position 1.

It is noted that the above steps S1 to S7, shown in FIG. 3, correspond to an exemplary embodiment of a method according to the present invention.

<Example>

Figure 4:
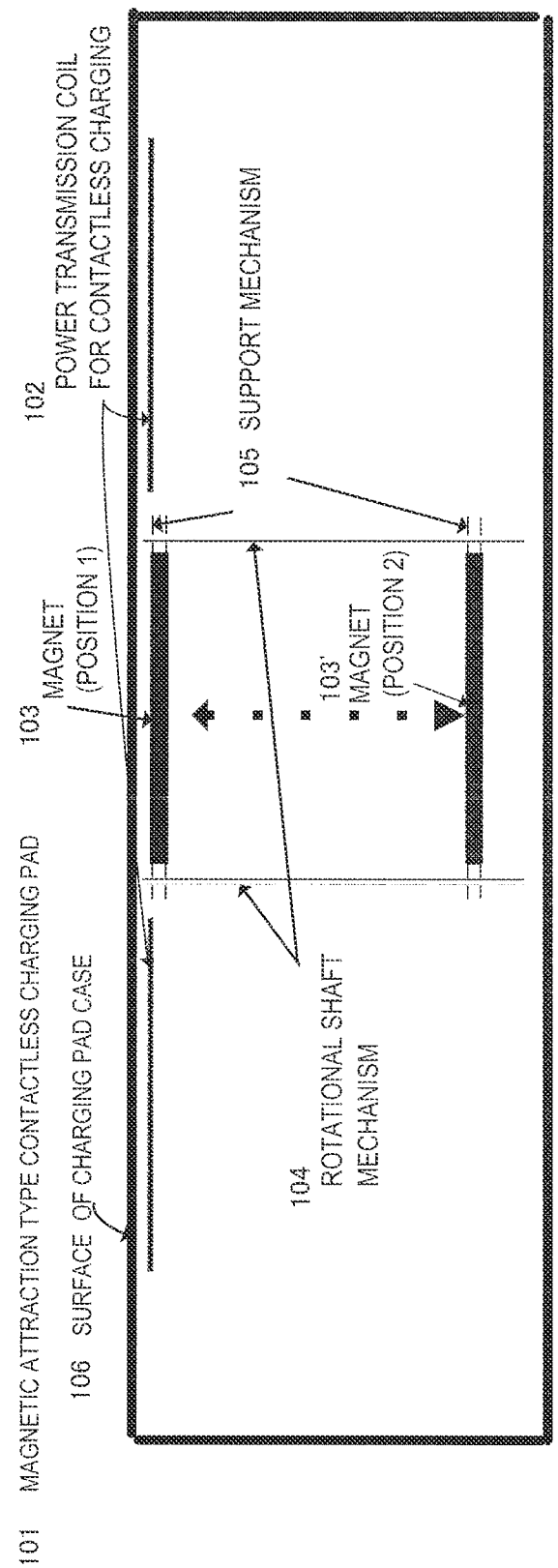
FIG. 4 is a schematic diagram for illustrating an arrangement of an example of the present invention.

FIG. 4 is a diagram illustrating a concrete example of the first exemplary embodiment of the present invention. FIG. 4. illustrates, in a schematic cross-sectional view, an example mechanism in the magnetic attraction type contactless charging pad 101 of FIG. 2 in which the magnet 103 is moved from the position 1 to the position 2 and housed therein and is then returned from the position 2 to the position 1. It is noted that, in the magnetic attraction type contactless charging pad 101, at least a zone between the positions 1 and 2 is a hollow region within which the magnet 103 can be moved upward and downward.

The magnetic attraction type contactless charging pad 101 includes a rotation shaft mechanism 104 which rotation is driven by for example, an electric motor, not shown, and a support mechanism 105 carrying the magnet 103, as shown in FIG. 4.

Though not limited thereto, rotation control in the rotation shaft mechanism 104 is performed by a control circuit, not shown, provided in the magnetic attraction type contactless charging pad 101 that receives a movement instruction from for example, a receiver (an apparatus to be charged; an apparatus to be charged 1 shown in FIG. 1), not shown. The support mechanism 105 is a plate-shaped structure fitted to the magnet 103.

Though not limited thereto, in this example, the configuration is provided in such a manner that a rotation shaft of the rotation shaft mechanism 104 runs in rotation driven by for an electric motor or the like to cause the support mechanism 105 carrying the magnet 103 thereon to be moved (reciprocating motion of downward and upward) between the position 1 and the position 2.

Among receivers that are contactlessly charged, there is such a one that is adversely affected in its function or characteristic by a magnetic force of the position aligning magnet 103 provided in the magnetic attraction type contactless charging pad 101, as described above. For example, regarding a portable phone terminal or the like including a dynamic loudspeaker or an on/off switch of magnetic detection type, there is a problem that a function or characteristic of the speaker or on/off switch is affected and deteriorated by a magnetization due to a long period of exposure to a magnetic force of the position aligning magnet or by the influence by the magnetic force.

Contrary to this, in the exemplary embodiment, it is possible to enjoy a position aligning function by a magnetic force (magnetic force of the position aligning magnet 103), as a characteristic of the magnetic attraction type contactless charging pad and to eliminate an influence of the magnetic force on the receiver.

In the above described exemplary embodiment, the position aligning magnet 103 in the magnetic attraction type contactless charging pad 101, is displaced and housed (step S4) after the start of charging (step S3). However, the displacement and housing of the magnet 103 is not limited to only after the start of charging (step S3). For example, the step S4 may be carried out in a stage where the receiver has been placed on the magnetic attraction type contactless charging pad 101 (in a stage where position aligning has been finished). In such a case, the steps S4 and S3 are carried out after YES decision in the step S2 in FIG. 3.

In the exemplary embodiment, the step S4 (the step of displacement and housing of the magnet 103 within the magnetic attraction type contactless charging pad 101) is carried out, after YES branching of the step S2 (a stage wherein the receiver is placed on the magnetic attraction type contactless charging pad 101) or after the step S3 (start of charging). However, the present invention, as a matter of course, is not limited to such control.

For example, a decision (instruction decision) as to whether or not the step S4 (displacement and housing of the magnet 103 within the charging pad 101) is to be carried out, may be carried out from a side of a terminal that is a receiver (for example, a portable phone terminal or a portable information terminal). A terminal as a receiver may gives a decision as to whether or not the step S4 (displacement and housing of the magnet 103 within the charging pad 101) is to be carried out, and may also effect, based on a result of the decision, a branching of processing as to whether or not the displacement and housing of the magnet 103 is to be carried out. For example, a terminal as the receiver may be configured so that, on detection of a start of contactless charging, the terminal as the receiver sends an instruction (notification) to a control circuit, not shown, provided in the magnetic attraction type contactless charging pad 101. The magnetic attraction type contactless charging pad 101 then may control to execute the step S4 (displacement and housing of the magnet 103 within the magnetic attraction type contactless charging pad 101), based on the notification. The terminal, as the receiver, then communicates with the contactless charging pad 101 using preset communication means. The communication means may connect with a terminal as the receiver, by a wireless or a wired communication. It is noted that as for a receiver inherently unaffected by a magnetic force, the step S4 (displacement and housing of the magnet 103 within the magnetic attraction type contactless charging pad 101) is not carried out.

<Exemplary Embodiment 2>

In the above described first exemplary embodiment, the magnet 103 is vertically displaced (for example, caused to descend) at a right angle to a case surface (plane on which the magnet 103 is placed) of the magnetic attraction type contactless charging pad 101, after the position aligning of the receiver. Alternatively, in FIG. 4, a magnetic shielding member (plate) may be inserted, after the position aligning of the receiver, from for example, a horizontal direction of FIG. 4, in a space between the magnet 103 and the charging pad case surface 106. That is, when executing position alignment of the receiver, the magnetic shielding member (plate) does not cover the magnet 103, and the receiver is position-aligned using a magnetic force of the magnet 103. It is after the position aligning that the magnetic shielding member covers the magnet 103. In the magnetic attraction type contactless charging pad 101, the magnet 103 may, of course, be displaced vertically downwards relative to the casing surface of the magnetic attraction type contactless charging pad 101 as in the first exemplary embodiment.

In the above exemplary embodiments, there is used for example, a permanent magnet as a magnet of the position aligning means (3 of FIG. 1). However, the magnet of the position aligning means (3 of FIG. 1) is not restricted to a permanent magnet, but an electromagnet, as an example, may also be used. In the case where an electromagnet is used as a magnet of the position aligning means (3 of FIG. 1), the reducing means (4 of FIG. 1) may reduce an effect of the position aligning means by restricting or stopping a current supplied to an electromagnetic coil. In the above exemplary embodiments, the apparatus to be charged (receiver) includes a portable phone and a smartphone as well as a tablet terminal, an information terminal or as a variety of mobile electronic apparatuses, compatible to contactless charging, only by way of examples.

The above described exemplary embodiments may be summarized, though not limited thereto, as following Supplementary notes.

(Supplementary Note 1)
A charger comprising:
a contactless charging means to contactlessly charge an apparatus to be charged;
a position aligning means to perform position aligning of the apparatus to be charged; and
a reducing means to reduce an effect of the position aligning means.

(Supplementary Note 2)
The charger according to Supplementary note 1, wherein the reducing means reduces the effect of the position aligning means, after position aligning of the apparatus to be charged, based on start of contactless charging by the contactless charging means.

(Supplementary Note 3)
The charger according to Supplementary note 1 or 2, wherein the position aligning means includes a magnet, wherein the reducing means causes the magnet to be moved to a position spaced apart a predetermined distance from the apparatus to be charged after the position aligning of the apparatus to be charged.

(Supplementary Note 4)
The charger according to Supplementary note 3, wherein the position aligning of the apparatus to be charged by the position aligning means is performed as the magnet is set at a first position facing the apparatus to be charged, and wherein the reducing means causes the magnet of the position aligning means to be displaced, after the position aligning of the apparatus to be charged, to a second position spaced apart a predetermined distance in a vertical direction from the first position facing the apparatus to be charged.

(Supplementary Note 5)
The charger according to any one of Supplementary notes 1 to 3, wherein the reducing means reduces the effect of the position aligning means based on an instruction from the apparatus to be charged.

(Supplementary Note 6)
The charger according to Supplementary note 1 or 2, wherein the position aligning means includes a magnet, and wherein the reducing means covers the magnet by a magnetic shielding member after the position aligning of the magnet.

(Supplementary Note 7)
A terminal apparatus charged by a charger that performs contactless charging, wherein the terminal apparatus issues an instruction to the charger and causes the charger to reduce an effect of a means thereof that performs position aligning of the terminal apparatus. The terminal apparatus is the above defined apparatus to be charged which is charged by the charger according to any one of the Supplementary notes 1 to 6.

(Supplementary Note 8)
A control method comprising the steps of:
performing position aligning of an apparatus to be charged using a position aligning means of a charger that performs contactless charging of the apparatus to be charged; and
reducing an effect of the position aligning means.

(Supplementary Note 9)
The control method according to Supplementary note 8, comprising
performing reducing the effect of the position aligning means, based on start of the contactless charging, after position aligning of the apparatus to be charged.

(Supplementary Note 10)
The control method according to Supplementary note 8 or 9, comprising
in reducing the effect of the position aligning means, causing a magnet composing the position aligning means to be displaced to a position spaced a preset distance from the apparatus to be charged.

(Supplementary Note 11)
The control method according to Supplementary note 10, comprising:
performing position aligning of the apparatus to be charged, as the magnet is placed at a first position facing the apparatus to be charged; and
the reducing means causing the magnet of the position aligning means to be displaced, after the position aligning of the apparatus to be charged, from the first position facing the apparatus to be charged to a second position spaced vertically a preset distance from the first position.

(Supplementary Note 12)
The control method according to Supplementary note 8 or 9, comprising
performing reducing the effect of the position aligning means based on an instruction from the apparatus to be charged.

(Supplementary Note 13)
The control method according to Supplementary note 8 or 9, comprising
covering the magnet composing the position aligning means by a magnetic shielding member after the position aligning of the apparatus to be charged.

The disclosures of the above described Patent Documents are to be incorporated herein by reference. The particular exemplary embodiments or examples may be modified or adjusted within the scope of the entire disclosure of the present invention, inclusive of claims, based on the fundamental technical concept of the invention. Moreover, a variety of combinations or selection of elements herein disclosed (elements of Supplementary notes, Examples and drawings) may be made within the concept of the claims of the present invention. It is to be understood that the present invention includes a variety of changes or corrections that may occur to those skilled in the art in accordance with the total disclosures inclusive of the claims and the technical concept of the invention.

The invention claimed is:

1. A charger comprising:
   a contactless charging pad, wherein the contactless charging pad includes:
      a hollow region vertically extended from a surface of the contactless charging pad to a predetermined depth from the surface,
      a shaft vertically arranged in the hollow region,
      a support member attached to the shaft and vertically movable with rotation of the shaft,
      a magnet provided on the support member, and
      a power transmission coil arranged on the surface of the contactless charging pad,
   wherein the magnet on the support member is located at a first position in terms of a vertical direction at a time of position aligning of a receiver disposed on the surface of the contactless charging pad, while the magnet on the support member is located at a second position more displaced in the vertical direction from the surface than the first position at a time of contactless charging of the receiver.

2. The charger according to claim 1, wherein the second position is spaced apart a predetermined distance from the receiver.

3. The charger according to claim 1, further comprising a magnetic shielding member provided in a space under the surface of the contactless charging pad,
   wherein, at a time of position aligning of the receiver, the magnetic shielding member is accommodated in the space and not covering the magnet,
   and wherein the magnetic shielding member is located in a position to cover the magnet at a time of contactless charging of the receiver.

4. A receiver configured to be contactlessly charged by the charger defined in claim 1,
   wherein the receiver is configured to issue an instruction to the charger to cause the charger to move the magnet on the support member in the vertical direction in the hollow region.

5. A control method for contactlessly charging, by a charger that comprises a contactless charging pad, a receiver disposed on the surface of the contactless charging pad, wherein the contactless charging pad includes:
   a hollow region vertically extended from a surface of the contactless charging pad to a predetermined depth from the surface,
   a shaft vertically arranged in the hollow region,
   a support member attached to the shaft and vertically movable with rotation of the shaft,
   a magnet provided on the support member, and
   a power transmission coil arranged on the surface of the contactless charging pad,
   the method comprising:
   locating the magnet on the support member at a first position in terms of a vertical direction at a time of position aligning of the receiver; and
   locating the magnet on the support member at a second position more displayed in the vertical direction from the surface than the first position at a time of contactless charging of the receiver.

6. The control method according to claim 5, wherein the second position is spaced apart by a predetermined distance from the receiver.

7. The control method according to claim 5, comprising covering a magnet by a magnetic shielding member located between the surface and the magnet, at a time of contactless charging of the receiver,
   wherein, at a time of position aligning of the receiver, the magnetic shielding member is accommodated in a space under the surface and wherein the magnetic shielding member does not cover the magnet.

* * * * *